United States Patent
Todeschini et al.

(10) Patent No.: US 10,038,716 B2
(45) Date of Patent: Jul. 31, 2018

(54) SYSTEM AND METHOD FOR REGULATING BARCODE DATA INJECTION INTO A RUNNING APPLICATION ON A SMART DEVICE

(71) Applicant: Hand Held Products, Inc., Fort Mill, SC (US)

(72) Inventors: Erik Todeschini, Camillus, NY (US); Daniel D. Yeakley, Monroe, NC (US)

(73) Assignee: Hand Held Products, Inc., Fort Mill, SC (US)

( * ) Notice: Subject to any disclaimer, the term of this patent is extended or adjusted under 35 U.S.C. 154(b) by 103 days.

(21) Appl. No.: 14/702,110

(22) Filed: May 1, 2015

(65) Prior Publication Data

US 2016/0323310 A1    Nov. 3, 2016

(51) Int. Cl.
*H04L 29/06* (2006.01)
*G06F 21/62* (2013.01)

(52) U.S. Cl.
CPC ...... *H04L 63/1466* (2013.01); *G06F 21/6227* (2013.01)

(58) Field of Classification Search
CPC ............................. G06F 21/51; H04L 63/1433
(Continued)

(56) References Cited

U.S. PATENT DOCUMENTS

| 6,832,725 B2 | 12/2004 | Gardiner et al. |
| 7,128,266 B2 | 10/2006 | Marlton et al. |

(Continued)

FOREIGN PATENT DOCUMENTS

| WO | 2013163789 A1 | 11/2013 |
| WO | 2013173985 A1 | 11/2013 |

(Continued)

OTHER PUBLICATIONS

App Building Two cents' Worth: Barcode Apps for IPad/IPhne, Android & Blackberry by Good, published on Jul. 23, 2013.*
(Continued)

*Primary Examiner* — Carl G Colin
*Assistant Examiner* — Dereena T Cattungal
(74) *Attorney, Agent, or Firm* — Additon, Higgins & Pendleton, P.A.

(57) ABSTRACT

A system and method for regulating the injection of barcode scan data into an application running on a smart device is provided. The system includes a running application on a smart device. The running application has text fields with text field properties. The text field properties designate to either accept access or restrict access to the text fields from barcode scan data. The system further includes a keyboard buffer and a scan wedge having access to the keyboard buffer. The scan wedge is provided with means to discriminate between access and restricted access designations in the text field properties. The means to discriminate is configured to interrogate the text field properties to determine if the text field permits access to barcode scan data. The scan wedge is also configured to begin a barcode scan operation if the text field permits access to barcode scan data and to load barcode scan data into the keyboard buffer. The keyboard buffer is configured to display the barcode scan data as text in the text field of the application. The scan wedge is provided with logic to recognize patterns in barcode scan data. The scan wedge is configured to inspect the barcode scan data for regular patterns consistent with malicious attacks and if present, is configured to instruct the keyboard buffer to insert an error message in the running application.

19 Claims, 4 Drawing Sheets

(58) Field of Classification Search
USPC .................................................. 726/25, 27
See application file for complete search history.

(56) References Cited

U.S. PATENT DOCUMENTS

| | | | |
|---|---|---|---|
| 7,159,783 B2 | 1/2007 | Walczyk et al. | |
| 7,413,127 B2 | 8/2008 | Ehrhart et al. | |
| 7,726,575 B2 | 6/2010 | Wang et al. | |
| 8,294,969 B2 | 10/2012 | Plesko | |
| 8,296,477 B1 * | 10/2012 | Polk .................... | G06Q 99/00 |
| | | | 705/35 |
| 8,317,105 B2 | 11/2012 | Kotlarsky et al. | |
| 8,322,622 B2 | 12/2012 | Suzhou et al. | |
| 8,366,005 B2 | 2/2013 | Kotlarsky et al. | |
| 8,371,507 B2 | 2/2013 | Haggerty et al. | |
| 8,376,233 B2 | 2/2013 | Van Horn et al. | |
| 8,381,979 B2 | 2/2013 | Franz | |
| 8,390,909 B2 | 3/2013 | Plesko | |
| 8,408,464 B2 | 4/2013 | Zhu et al. | |
| 8,408,468 B2 | 4/2013 | Horn et al. | |
| 8,408,469 B2 | 4/2013 | Good | |
| 8,424,768 B2 | 4/2013 | Rueblinger et al. | |
| 8,448,863 B2 | 5/2013 | Xian et al. | |
| 8,457,013 B2 | 6/2013 | Essinger et al. | |
| 8,459,557 B2 | 6/2013 | Havens et al. | |
| 8,469,272 B2 | 6/2013 | Kearney | |
| 8,474,712 B2 | 7/2013 | Kearney et al. | |
| 8,479,992 B2 | 7/2013 | Kotlarsky et al. | |
| 8,490,877 B2 | 7/2013 | Kearney | |
| 8,517,271 B2 | 8/2013 | Kotlarsky et al. | |
| 8,523,076 B2 | 9/2013 | Good | |
| 8,528,818 B2 | 9/2013 | Ehrhart et al. | |
| 8,544,737 B2 | 10/2013 | Gomez et al. | |
| 8,548,420 B2 | 10/2013 | Grunow et al. | |
| 8,550,335 B2 | 10/2013 | Samek et al. | |
| 8,550,354 B2 | 10/2013 | Gannon et al. | |
| 8,550,357 B2 | 10/2013 | Kearney | |
| 8,556,174 B2 | 10/2013 | Kosecki et al. | |
| 8,556,176 B2 | 10/2013 | Van Horn et al. | |
| 8,556,177 B2 | 10/2013 | Hussey et al. | |
| 8,559,767 B2 | 10/2013 | Barber et al. | |
| 8,561,895 B2 | 10/2013 | Gomez et al. | |
| 8,561,903 B2 | 10/2013 | Sauerwein | |
| 8,561,905 B2 | 10/2013 | Edmonds et al. | |
| 8,565,107 B2 | 10/2013 | Pease et al. | |
| 8,571,307 B2 | 10/2013 | Li et al. | |
| 8,579,200 B2 | 11/2013 | Samek et al. | |
| 8,583,924 B2 | 11/2013 | Caballero et al. | |
| 8,584,945 B2 | 11/2013 | Wang et al. | |
| 8,587,595 B2 | 11/2013 | Wang | |
| 8,587,697 B2 | 11/2013 | Hussey et al. | |
| 8,588,869 B2 | 11/2013 | Sauerwein et al. | |
| 8,590,789 B2 | 11/2013 | Nahill et al. | |
| 8,596,539 B2 | 12/2013 | Havens et al. | |
| 8,596,542 B2 | 12/2013 | Havens et al. | |
| 8,596,543 B2 | 12/2013 | Havens et al. | |
| 8,599,271 B2 | 12/2013 | Havens et al. | |
| 8,599,957 B2 | 12/2013 | Peake et al. | |
| 8,600,158 B2 | 12/2013 | Li et al. | |
| 8,600,167 B2 | 12/2013 | Showering | |
| 8,602,309 B2 | 12/2013 | Longacre et al. | |
| 8,608,053 B2 | 12/2013 | Meier et al. | |
| 8,608,071 B2 | 12/2013 | Liu et al. | |
| 8,611,309 B2 | 12/2013 | Wang et al. | |
| 8,615,487 B2 | 12/2013 | Gomez et al. | |
| 8,621,123 B2 | 12/2013 | Caballero | |
| 8,622,303 B2 | 1/2014 | Meier et al. | |
| 8,628,013 B2 | 1/2014 | Ding | |
| 8,628,015 B2 | 1/2014 | Wang et al. | |
| 8,628,016 B2 | 1/2014 | Winegar | |
| 8,629,926 B2 | 1/2014 | Wang | |
| 8,630,491 B2 | 1/2014 | Longacre et al. | |
| 8,635,309 B2 | 1/2014 | Berthiaume et al. | |
| 8,636,200 B2 | 1/2014 | Kearney | |
| 8,636,212 B2 | 1/2014 | Nahill et al. | |
| 8,636,215 B2 | 1/2014 | Ding et al. | |
| 8,636,224 B2 | 1/2014 | Wang | |
| 8,638,806 B2 | 1/2014 | Wang et al. | |
| 8,640,958 B2 | 2/2014 | Lu et al. | |
| 8,640,960 B2 | 2/2014 | Wang et al. | |
| 8,643,717 B2 | 2/2014 | Li et al. | |
| 8,646,692 B2 | 2/2014 | Meier et al. | |
| 8,646,694 B2 | 2/2014 | Wang et al. | |
| 8,657,200 B2 | 2/2014 | Ren et al. | |
| 8,659,397 B2 | 2/2014 | Vargo et al. | |
| 8,668,149 B2 | 3/2014 | Good | |
| 8,678,285 B2 | 3/2014 | Kearney | |
| 8,678,286 B2 | 3/2014 | Smith et al. | |
| 8,682,077 B1 | 3/2014 | Longacre | |
| D702,237 S | 4/2014 | Oberpriller et al. | |
| 8,687,282 B2 | 4/2014 | Feng et al. | |
| 8,692,927 B2 | 4/2014 | Pease et al. | |
| 8,695,880 B2 | 4/2014 | Bremer et al. | |
| 8,698,949 B2 | 4/2014 | Grunow et al. | |
| 8,702,000 B2 | 4/2014 | Barber et al. | |
| 8,717,494 B2 | 5/2014 | Gannon | |
| 8,720,783 B2 | 5/2014 | Biss et al. | |
| 8,723,804 B2 | 5/2014 | Fletcher et al. | |
| 8,723,904 B2 | 5/2014 | Marty et al. | |
| 8,727,223 B2 | 5/2014 | Wang | |
| 8,740,082 B2 | 6/2014 | Wilz | |
| 8,740,085 B2 | 6/2014 | Furlong et al. | |
| 8,746,563 B2 | 6/2014 | Hennick et al. | |
| 8,750,445 B2 | 6/2014 | Peake et al. | |
| 8,752,766 B2 | 6/2014 | Xian et al. | |
| 8,756,059 B2 | 6/2014 | Braho et al. | |
| 8,757,495 B2 | 6/2014 | Qu et al. | |
| 8,760,563 B2 | 6/2014 | Koziol et al. | |
| 8,736,909 B2 | 7/2014 | Reed et al. | |
| 8,777,108 B2 | 7/2014 | Coyle | |
| 8,777,109 B2 | 7/2014 | Oberpriller et al. | |
| 8,779,898 B2 | 7/2014 | Havens et al. | |
| 8,781,520 B2 | 7/2014 | Payne et al. | |
| 8,783,573 B2 | 7/2014 | Havens et al. | |
| 8,789,757 B2 | 7/2014 | Barten | |
| 8,789,758 B2 | 7/2014 | Hawley et al. | |
| 8,789,759 B2 | 7/2014 | Xian et al. | |
| 8,794,520 B2 | 8/2014 | Wang et al. | |
| 8,794,522 B2 | 8/2014 | Ehrhart | |
| 8,794,525 B2 | 8/2014 | Amundsen et al. | |
| 8,794,526 B2 | 8/2014 | Wang et al. | |
| 8,798,367 B2 | 8/2014 | Ellis | |
| 8,807,431 B2 | 8/2014 | Wang et al. | |
| 8,807,432 B2 | 8/2014 | Van Horn et al. | |
| 8,820,630 B2 | 9/2014 | Qu et al. | |
| 8,822,848 B2 | 9/2014 | Meagher | |
| 8,824,692 B2 | 9/2014 | Sheerin et al. | |
| 8,824,696 B2 | 9/2014 | Braho | |
| 8,842,849 B2 | 9/2014 | Wahl et al. | |
| 8,844,822 B2 | 9/2014 | Kotlarsky et al. | |
| 8,844,823 B2 | 9/2014 | Fritz et al. | |
| 8,849,019 B2 | 9/2014 | Li et al. | |
| D716,285 S | 10/2014 | Chaney et al. | |
| 8,851,383 B2 | 10/2014 | Yeakley et al. | |
| 8,854,633 B2 | 10/2014 | Laffargue | |
| 8,866,963 B2 | 10/2014 | Grunow et al. | |
| 8,868,421 B2 | 10/2014 | Braho et al. | |
| 8,868,519 B2 | 10/2014 | Maloy et al. | |
| 8,868,802 B2 | 10/2014 | Barten | |
| 8,868,803 B2 | 10/2014 | Bremer et al. | |
| 8,870,074 B1 | 10/2014 | Gannon | |
| 8,879,639 B2 | 11/2014 | Sauerwein | |
| 8,880,426 B2 | 11/2014 | Smith | |
| 8,881,983 B2 | 11/2014 | Havens et al. | |
| 8,881,987 B2 | 11/2014 | Wang | |
| 8,903,172 B2 | 12/2014 | Smith | |
| 8,908,995 B2 | 12/2014 | Benos et al. | |
| 8,910,870 B2 | 12/2014 | Li et al. | |
| 8,910,875 B2 | 12/2014 | Ren et al. | |
| 8,914,290 B2 | 12/2014 | Hendrickson et al. | |
| 8,914,788 B2 | 12/2014 | Pettinelli et al. | |
| 8,915,439 B2 | 12/2014 | Feng et al. | |
| 8,915,444 B2 | 12/2014 | Havens et al. | |
| 8,916,789 B2 | 12/2014 | Woodburn | |

(56) References Cited

U.S. PATENT DOCUMENTS

| | | |
|---|---|---|
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,082,023 B2 | 7/2015 | Feng et al. |
| 9,262,633 B1* | 2/2016 | Todeschini ............ G06F 21/56 |
| 9,338,164 B1* | 5/2016 | Liu ................ H04L 63/0869 |
| 2007/0063048 A1 | 3/2007 | Havens et al. |
| 2009/0134221 A1 | 5/2009 | Zhu et al. |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2010/0321739 A1* | 12/2010 | Amagai ................ G06T 3/00 358/3.28 |
| 2011/0169999 A1 | 7/2011 | Grunow et al. |
| 2011/0202554 A1 | 8/2011 | Powilleit et al. |
| 2012/0111946 A1 | 5/2012 | Golant |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0223141 A1 | 9/2012 | Good et al. |
| 2012/0308003 A1* | 12/2012 | Mukherjee ............ G09C 5/00 380/243 |
| 2013/0043312 A1 | 2/2013 | Van Horn |
| 2013/0075168 A1 | 3/2013 | Amundsen et al. |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedraro |
| 2013/0307964 A1 | 11/2013 | Bremer et al. |
| 2013/0308625 A1 | 11/2013 | Corcoran |
| 2013/0313324 A1 | 11/2013 | Koziol et al. |
| 2013/0313325 A1 | 11/2013 | Wilz et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0022572 A1* | 1/2014 | Washington ...... G06F 17/30265 358/1.13 |
| 2014/0025584 A1 | 1/2014 | Liu et al. |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Li et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0121438 A1 | 5/2014 | Kearney |
| 2014/0121445 A1 | 5/2014 | Ding et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131441 A1 | 5/2014 | Nahill et al. |
| 2014/0131443 A1 | 5/2014 | Smith |
| 2014/0131444 A1 | 5/2014 | Wang |
| 2014/0131448 A1 | 5/2014 | Xian et al. |
| 2014/0133379 A1 | 5/2014 | Wang et al. |
| 2014/0136208 A1 | 5/2014 | Maltseff et al. |

(56) References Cited

U.S. PATENT DOCUMENTS

| | | |
|---|---|---|
| 2014/0140585 A1 | 5/2014 | Wang |
| 2014/0151453 A1 | 6/2014 | Meier et al. |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0191644 A1 | 7/2014 | Chaney |
| 2014/0191913 A1 | 7/2014 | Ge et al. |
| 2014/0197234 A1* | 7/2014 | Hammad .............. G06Q 30/06 235/379 |
| 2014/0197238 A1 | 7/2014 | Lui et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0232930 A1 | 8/2014 | Anderson |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1 | 9/2014 | DiGregorio |
| 2014/0282210 A1 | 9/2014 | Bianconi |
| 2014/0283118 A1* | 9/2014 | Anderson .............. G06F 21/51 726/27 |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van Horn et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0006672 A1* | 1/2015 | Morel .............. G06Q 30/0269 709/217 |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0019444 A1* | 1/2015 | Purves .............. G06Q 20/382 705/76 |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071818 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0169925 A1 | 6/2015 | Chang et al. |
| 2015/0169929 A1 | 6/2015 | Williams et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0204671 A1 | 7/2015 | Showering |
| 2016/0099963 A1* | 4/2016 | Mahaffey .............. H04L 63/1433 726/25 |

FOREIGN PATENT DOCUMENTS

| | | |
|---|---|---|
| WO | 2014019130 A1 | 2/2014 |
| WO | 2014110495 A1 | 7/2014 |

OTHER PUBLICATIONS

Scanning Barcodes with Androids devices—TracerPlus Support Center, published on Oct. 17, 2013.*

Create your own Barcode Scanning App in Minutes on ioS and Androids Devices by Baldwin, published on Apr. 17, 2012.*

U.S. Appl. No. 14/519,179 for Dimensioning System With Multipath Interference Mitigation filed Oct. 21, 2014 (Thuries et al.); 30 pages.

U.S. Appl. No. 14/264,173 for Autofocus Lens System for Indicia Readers filed Apr. 29, 2014, (Ackley et al.); 39 pages.

U.S. Appl. No. 14/453,019 for Dimensioning System With Guided Alignment, filed Aug. 6, 2014 (Li et al.); 31 pages.

U.S. Appl. No. 14/452,697 for Interactive Indicia Reader , filed Aug. 6, 2014, (Todeschini); 32 pages.

U.S. Appl. No. 14/231,898 for Hand-Mounted Indicia-Reading Device with Finger Motion Triggering filed Apr. 1, 2014 (Van Horn et al.); 36 pages.

U.S. Appl. No. 14/715,916 for Evaluating Image Values filed May 19, 2015 (Ackley); 60 pages.

U.S. Appl. No. 14/513,808 for Identifying Inventory Items in a Storage Facility filed Oct. 14, 2014 (Singel et al.); 51 pages.

U.S. Appl. No. 29/458,405 for an Electronic Device, filed Jun. 19, 2013 (Fitch et al.); 22 pages.

U.S. Appl. No. 29/459,620 for an Electronic Device Enclosure, filed Jul. 2, 2013 (London et al.); 21 pages.

U.S. Appl. No. 14/483,056 for Variable Depth of Field Barcode Scanner filed Sep. 10, 2014 (McCloskey et al.); 29 pages.

U.S. Appl. No. 14/531,154 for Directing an Inspector Through an Inspection filed Nov. 3, 2014 (Miller et al.); 53 pages.

U.S. Appl. No. 29/525,068 for Tablet Computer With Removable Scanning Device filed Apr. 27, 2015 (Schulte et al.); 19 pages.

(56) References Cited

OTHER PUBLICATIONS

U.S. Appl. No. 29/468,118 for an Electronic Device Case, filed Sep. 26, 2013 (Oberpriller et al.); 44 pages.
U.S. Appl. No. 14/340,627 for an Axially Reinforced Flexible Scan Element, filed Jul. 25, 2014 (Reublinger et al.); 41 pages.
U.S. Appl. No. 14/676,327 for Device Management Proxy for Secure Devices filed Apr. 1, 2015 (Yeakley et al.); 50 pages.
U.S. Appl. No. 14/257,364 for Docking System and Method Using Near Field Communication filed Apr. 21, 2014 (Showering); 31 pages.
U.S. Appl. No. 14/327,827 for a Mobile-Phone Adapter for Electronic Transactions, filed Jul. 10, 2014 (Hejl); 25 pages.
U.S. Appl. No. 14/334,934 for a System and Method for Indicia Verification, filed Jul. 18, 2014 (Hejl); 38 pages.
U.S. Appl. No. 29/530,600 for Cyclone filed Jun. 18, 2015 (Vargo et al); 16 pages.
U.S. Appl. No. 14/707,123 for Application Independent DEX/UCS Interface filed May 8, 2015 (Pape); 47 pages.
U.S. Appl. No. 14/283,282 for Terminal Having Illumination and Focus Control filed May 21, 2014 (Liu et al.); 31 pages.
U.S. Appl. No. 14/619,093 for Methods for Training a Speech Recognition System filed Feb. 11, 2015 (Pecorari); 35 pages.
U.S. Appl. No. 29/524,186 for Scanner filed Apr. 17, 2015 (Zhou et al.); 17 pages.
U.S. Appl. No. 14/705,407 for Method and System to Protect Software-Based Network-Connected Devices From Advanced Persistent Threat filed May 6, 2015 (Hussey et al.); 42 pages.
U.S. Appl. No. 14/614,706 for Device for Supporting an Electronic Tool on a User's Hand filed Feb. 5, 2015 (Oberpriller et al.); 33 pages.
U.S. Appl. No. 14/628,708 for Device, System, and Method for Determining the Status of Checkout Lanes filed Feb. 23, 2015 (Todeschini); 37 pages.
U.S. Appl. No. 14/704,050 for Intermediate Linear Positioning filed May 5, 2015 (Charpentier et al.); 60 pages.
U.S. Appl. No. 14/529,563 for Adaptable Interface for a Mobile Computing Device filed Oct. 31, 2014 (Schoon et al.); 36 pages.
U.S. Appl. No. 14/705,012 for Hands-Free Human Machine Interface Responsive to a Driver of a Vehicle filed May 6, 2015 (Fitch et al.); 44 pages.
U.S. Appl. No. 14/715,672 for Augumented Reality Enabled Hazard Display filed May 19, 2015 (Venkatesha et al.); 35 pages.
U.S. Appl. No. 14/695,364 for Medication Management System filed Apr. 24, 2015 (Sewell et al.); 44 pages.
U.S. Appl. No. 14/664,063 for Method and Application for Scanning a Barcode With a Smart Device While Continuously Running and Displaying an Application on the Smart Device Display filed Mar. 20, 2015 (Todeschini); 37 pages.
U.S. Appl. No. 14/735,717 for Indicia-Reading Systems Having an Interface With a User's Nervous System filed Jun. 10, 2015 (Todeschini); 39 pages.
U.S. Appl. No. 14/527,191 for Method and System for Recognizing Speech Using Wildcards in an Expected Response filed Oct. 29, 2014 (Braho et al.); 45 pages.
U.S. Appl. No. 14/702,110 for System and Method for Regulating Barcode Data Injection Into a Running Application on a Smart Device filed May 1, 2015 (Todeschini et al.); 38 pages.
U.S. Appl. No. 14/535,764 for Concatenated Expected Responses for Speech Recognition filed Nov. 7, 2014 (Braho et al.); 51 pages.
U.S. Appl. No. 14/687,289 for System for Communication Via a Peripheral Hub filed Apr. 15, 2015 (Kohtz et al.); 37 pages.
U.S. Appl. No. 14/747,197 for Optical Pattern Projector filed Jun. 23, 2015 (Thuries et al.); 33 pages.
U.S. Appl. No. 14/674,329 for Aimer for Barcode Scanning filed Mar. 31, 2015 (Bidwell); 36 pages.
U.S. Appl. No. 14/702,979 for Tracking Battery Conditions filed May 4, 2015 (Young et al.); 70 pages.
U.S. Appl. No. 29/529,441 for Indicia Reading Device filed Jun. 8, 2015 (Zhou et al.); 14 pages.

U.S. Appl. No. 14/747,490 for Dual-Projector Three-Dimensional Scanner filed Jun. 23, 2015 (Jovanovski et al.); 40 pages.
U.S. Appl. No. 14/740,320 for Tactile Switch for a Mobile Electronic Device filed Jun. 16, 2015 (Barndringa); 38 pages.
U.S. Appl. No. 14/695,923 for Secure Unattended Network Authentication filed Apr. 24, 2015 (Kubler et al.); 52 pages.
U.S. Appl. No. 14/740,373 for Calibrating a Volume Dimensioner filed Jun. 16, 2015 (Ackley et al.); 63 pages.
U.S. Appl. No. 13/367,978, filed Feb. 7, 2012, (Feng et al.); now abandoned.
U.S. Appl. No. 14/462,801 for Mobile Computing Device With Data Cognition Software, filed on Aug. 19, 2014 (Todeschini et al.); 38 pages.
U.S. Appl. No. 14/596,757 for System and Method for Detecting Barcode Printing Errors filed Jan. 14, 2015 (Ackley); 41 pages.
U.S. Appl. No. 14/277,337 for Multipurpose Optical Reader, filed May 14, 2014 (Jovanovski et al.); 59 pages.
U.S. Appl. No. 14/200,405 for Indicia Reader for Size-Limited Applications filed Mar. 7, 2014 (Feng et al.); 42 pages.
U.S. Appl. No. 14/662,922 for Multifunction Point of Sale System filed Mar. 19, 2015 (Van Horn et al.); 41 pages.
U.S. Appl. No. 14/446,391 for Multifunction Point of Sale Apparatus With Optical Signature Capture filed Jul. 30, 2014 (Good et al.); 37 pages.
U.S. Appl. No. 29/528,165 for In-Counter Barcode Scanner filed May 27, 2015 (Oberpriller et al.); 13 pages.
U.S. Appl. No. 29/528,890 for Mobile Computer Housing filed Jun. 2, 2015 (Fitch et al.); 61 pages.
U.S. Appl. No. 14/614,796 for Cargo Apportionment Techniques filed Feb. 5, 2015 (Morton et al.); 56 pages.
U.S. Appl. No. 29/516,892 for Table Computer filed Feb. 6, 2015 (Bidwell et al.); 13 pages.
U.S. Appl. No. 29/523,098 for Handle for a Tablet Computer filed Apr. 7, 2015 (Bidwell et al.); 17 pages.
U.S. Appl. No. 14/578,627 for Safety System and Method filed Dec. 22, 2014 (Ackley et al.); 32 pages.
U.S. Appl. No. 14/573,022 for Dynamic Diagnostic Indicator Generation filed Dec. 17, 2014 (Goldsmith); 43 pages.
U.S. Appl. No. 14/529,857 for Barcode Reader With Security Features filed Oct. 31, 2014 (Todeschini et al.); 32 pages.
U.S. Appl. No. 14/519,195 for Handheld Dimensioning System With Feedback filed Oct. 21, 2014 (Laffargue et al.); 39 pages.
U.S. Appl. No. 14/519,211 for System and Method for Dimensioning filed Oct. 21, 2014 (Ackley et al.); 33 pages.
U.S. Appl. No. 14/519,233 for Handheld Dimensioner With Data-Quality Indication filed Oct. 21, 2014 (Laffargue et al.); 36 pages.
U.S. Appl. No. 14/533,319 for Barcode Scanning System Using Wearable Device With Embedded Camera filed Nov. 5, 2014 (Todeschini); 29 pages.
U.S. Appl. No. 14/748,446 for Cordless Indicia Reader With a Multifunction Coil for Wireless Charging and EAS Deactivation, filed Jun. 24, 2015 (Xie et al.); 34 pages.
U.S. Appl. No. 29/528,590 for Electronic Device filed May 29, 2015 (Fitch et al.); 9 pages.
U.S. Appl. No. 14/519,249 for Handheld Dimensioning System With Measurement-Conformance Feedback filed Oct. 21, 2014 (Ackley et al.); 36 pages.
U.S. Appl. No. 29/519,017 for Scanner filed Mar. 2, 2015 (Zhou et al.); 11 pages.
U.S. Appl. No. 14/398,542 for Portable Electronic Devices Having a Separate Location Trigger Unit for Use in Controlling an Application Unit filed Nov. 3, 2014 (Bian et al.); 22 pages.
U.S. Appl. No. 14/405,278 for Design Pattern for Secure Store filed Mar. 9, 2015 (Zhu et al.); 23 pages.
U.S. Appl. No. 14/590,024 for Shelving and Package Locating Systems for Delivery Vehicles filed Jan. 6, 2015 (Payne); 31 pages.
U.S. Appl. No. 14/568,305 for Auto-Contrast Viewfinder for an Indicia Reader filed Dec. 12, 2014 (Todeschini); 29 pages.
U.S. Appl. No. 29/526,918 for Charging Base filed May 14, 2015 (Fitch et al.); 10 pages.

(56) References Cited

OTHER PUBLICATIONS

U.S. Appl. No. 14/580,262 for Media Gate for Thermal Transfer Printers filed Dec. 23, 2014 (Bowles); 36 pages.

* cited by examiner

SYSTEM AND METHOD FOR REGULATING BARCODE DATA INJECTION INTO A RUNNING APPLICATION ON A SMART DEVICE

FIELD OF THE INVENTION

The present invention relates to mobile devices and barcode scanning, and in particular to protecting applications from SQL injection during barcode scanning operations.

BACKGROUND

Generally speaking there are many Smartphone and mobile device applications that require the ability to scan a barcode. In order for a developer to add barcode scanning capability to their application, developers quite frequently rely on a third party software development kit (SDK). The SDK must be integrated into their application. This only gives the user access to barcode scanning from within that particular application. If a user wants a universal method of scanning barcodes for data entry across all their applications, even for applications written by a third party, the solution is more complicated.

Sometimes a keyboard wedge style application is used to facilitate universal scanning in any application by keeping a background service running that responds to a particular key press. When the service detects this key press, it brings up the barcode scanner and inserts the resultant scan data into the keyboard buffer so that it is inserted at the cursor as text in whichever application has focus at the moment.

A keyboard wedge can be either a software program or an inserted hardware device that translates digital signals from a barcode reader or magnetic strip reader into keyboard strokes for a computer, smartphone, or mobile device. The software form of a keyboard wedge intercepts the digital signals from the reader when they arrive at the computer and instantly translates them into keyboard strokes. Data sent through a wedge appears as if it was typed into the device, while the keyboard itself remains fully functional. Because an application running on a computer or a mobile device using a keyboard wedge cannot tell the difference between data that is entered by a scanning device or data that is entered by keyboard typing, a wedge can be used to easily add barcode reading capability to an existing device without modifying software applications.

Today, many Smartphone operating systems allow you to create custom software keyboards (software input panels) which are sometimes used to add a barcode scanning button and associated scan wedge functionality. When the custom keyboard is loaded, if the user wants to enter barcode data into a text field they simply open the software keyboard, hit the scanner button, scan the barcode and the result is placed in the text field that has focus.

Each of these types of keyboard wedges or scan wedge applications do not care what fields they enter data into, assuming they are editable. The applications cannot discriminate which fields scan wedge data is allowed in. This is because the application cannot differentiate between scan wedge data and actual keyboard data. This can be a security risk as barcode data could contain malicious code injection attacks (e.g. SQL Injection) disguised as valid data, which could seriously compromise application data.

SQL Injection is a code injection technique, where malicious software is used to attack data-driven applications. Typically statements are inserted into an entry field for execution, for example to dump the database contents of a running application to the malicious attacker. SQL injection attacks are considered one of the top vulnerabilities on the internet.

Therefore, a need exists for system to scan barcodes into applications running on smartphones or mobile devices with the functionality and flexibility of a scan wedge while regulating the data the running application is exposed to from a barcode scan.

SUMMARY

Accordingly, in one aspect, the present invention embraces a system for regulating the injection of barcode scan data into an application running on a smart device. In the present invention a smart device may be a smartphone or a tablet. For purposes of the present invention, a smart device has a central processing unit, barcode scanning operation capability, a viewfinder, and an embedded camera. The smart device also includes a visual display and a keypad. As known in the art, a custom software input panel keypad is provided with a barcode scanning key. Additionally, the smart device has an operating system, is wireless communication enabled, and has other features commonly found on smart devices. These components of the smart device are communicatively linked.

In an exemplary embodiment, the system comprises a running application on a smart device. The running application has text fields. Each of the text fields has text field properties. The text field properties are designated to either accept access or restrict access to each of the text fields from barcode scan data. The system also comprises a keyboard buffer and a scan wedge. The scan wedge has access to the keyboard buffer. The scan wedge is further provided with means to discriminate between access and restricted access designations in the text field properties. The means to discriminate are configured to interrogate the text field properties to determine if the text field permits access to barcode scan data. The scan wedge is also configured to begin a barcode scan operation if the text field permits access to barcode scan data. The scan wedge is further configured to load barcode scan data into the keyboard buffer. The keyboard buffer is configured to display the barcode scan data as text in the text field of the application.

In another exemplary embodiment, the scan wedge is provided with logic to recognize patterns in barcode scan data. The scan wedge is configured to inspect the barcode scan data for regular patterns consistent with malicious attacks. The scan wedge is configured to instruct the keyboard buffer to insert an error message in the running application if the regular patterns are found.

In yet another exemplary embodiment of the system, at least one of the text field properties is a readable property of the text field. The readable property has associated values which describe attributes of the text field. The attributes designate whether access to the text field is permitted or not permitted. The scan wedge is provided with the value of the readable property. The property and the associated property are a value pair. The scan wedge is configured to look for the value pairs of the text field property. The scan wedge is further configured to begin the barcode scan operation only if the value pair on the text property corresponds to the value pair provided on the scan wedge.

In another exemplary embodiment of the system, the readable property describes the text field and is selected from an id, a name, a tag, and other descriptor properties.

In another exemplary embodiment of the system, the means to discriminate is accomplished with programming techniques selected from reflection and introspection.

In yet another exemplary embodiment of the system, the scan wedge is configured to close if the text field restricts access to barcode scan data.

In another exemplary embodiment of the system, the scan wedge is configured to load an error message in the keyboard buffer if the text field restricts access to barcode scan data. The keyboard buffer is then configured to display the error message in the text field of the running application.

In yet another exemplary embodiment of the system, the means to discriminate comprises a white list and a black list provided on the scan wedge. The text field properties are values either on the white list or on the black list. Values on the white list designate permitted access to the text field by barcode scan data; values on the black list designate restricted access to the text field by barcode scan data. The scan wedge is configured to interrogate the text field properties and identify whether the text field property values are on the white list or on the black list.

In yet another exemplary embodiment of the system, the application is native on the smart device.

In yet another exemplary embodiment of the system, the application is a web application running in a browser on the smart device.

In another aspect, the present invention embraces a method of regulating the injection of barcode scan data into a running application on a smart device. The smart device, for the purposes of the present invention may be a smartphone or a tablet. In addition, as known in the art, a smart device will generally have a central processing unit, barcode scanning operation capability, a viewfinder, and an embedded camera. The smart device also includes a visual display and a keypad. As known in the art, a custom software input panel keypad is provided with a barcode scanning key. Additionally, the smart device has an operating system, is wireless communication enabled, and has other features commonly found on smart devices. These components of the smart device are communicatively linked.

In an exemplary embodiment of the invention the method comprises the steps of: running an application on a smart device, the application having at least one text field, the text field having text field properties, the text field properties designate whether bar code scan data is permitted or not permitted in the text field; inspecting the running application with a scan wedge; finding the text field within the application having focus with the scan wedge; reviewing and cross-referencing properties of the text field with the scan wedge; determining if barcode data can be deposited in the text field based on the properties reviewed.

In another exemplary embodiment, the method further comprises the step of: commencing a barcode scan if the determining step shows that barcode data is permitted.

In another exemplary embodiment, the method further comprises the steps of: inspecting barcode scan data for regular patterns of malicious attacks; loading the barcode scan data into the keyboard buffer; inserting the barcode scan data as text in the text field of the running application if no regular patterns are found in the inspecting barcode scan data step; and displaying an error message if regular patterns are found in the inspecting barcode scan data step.

In yet another exemplary embodiment, the method further comprises the step of: closing the scan wedge application if the determining step shows that barcode data is not permitted.

In another exemplary embodiment of the invention, the method further comprises the step of: displaying an error message.

In another exemplary embodiment of the method, the scan wedge is provided with programming capabilities selected from reflection and introspection, and wherein the inspecting step, the finding step, and the reviewing step are accomplished using the programming techniques.

In yet another exemplary embodiment of the method, the scan wedge is provided with logic, and the inspecting barcode scan data step is accomplished using the logic.

In another exemplary embodiment of the method the scan wedge is provided with a white list and a black list. The text field properties are values either on the white list or on the black list. Values on the white list designate permitted access to the text field by barcode scan data, and values on the black list designate restricted access to the text field by barcode scan data. The reviewing step is accomplished by cross-referencing the text field property values with the white list and black list on the scan wedge.

In another exemplary embodiment of the method, the barcode data can be deposited in a text field if the determining step shows the text field property value is on the white list of the scan wedge.

In yet another exemplary of the method, the barcode data cannot be deposited in a text field if the determining step shows the text field property value is on the black list of the scan wedge.

The foregoing illustrative summary, as well as other exemplary objectives and/or advantages of the invention, and the manner in which the same are accomplished, are further explained within the following detailed description and its accompanying drawings.

DETAILED DESCRIPTION

The present invention embraces a system for regulating the injection of barcode scan data into an application running on a smart device. The smart device may be a smart phone, tablet, or the like. Generally, a smart device proper to the present invention will have certain components as depicted schematically in FIG. 1. Referring to the Figure, a smart device (5) would have the following components: a computer processing unit (CPU) (6), and operating system (7), a wireless communication system (8), barcode scan software (9), a bus (10) which enables the components to be communicatively linked, a viewfinder (11), which would appear on the visual display (13), and an embedded camera (12). All the heretofore components are communicatively linked via the system bus (10). The smart device (5) may have many other components, as is known in the art. The smart device (5) has the capability of running native or resident applications and of running applications on a browser from the internet or the web, accessed by the wireless communication system (8).

Figure 1:
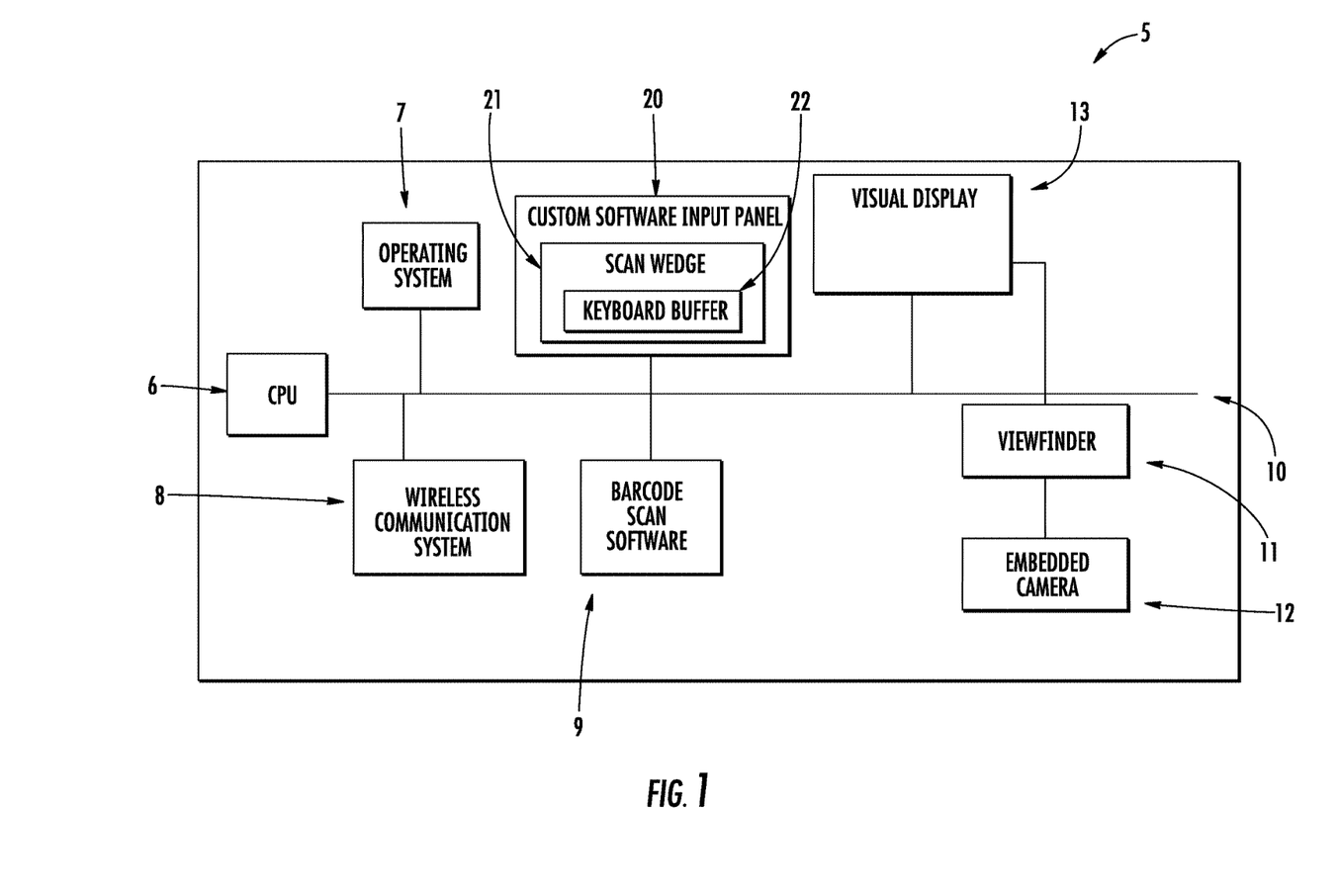
FIG. 1 schematically depicts a smart device with components of the system of the present invention installed on the smart device.

In an exemplary embodiment, the smart device (5) is further provided with a keyboard wedge or scan wedge (21) application, which communicatively linked to the other components of the smart device (5). The scan wedge (21) application is enabled through a custom software input panel (20). The custom software input panel (20) preferably has a barcode scan key (not shown) which when touched would activate the scan wedge application (21). The scan wedge (21) has access to a keyboard buffer (22). The keyboard buffer (22) can insert data, such as barcode scan data, as text in a running application on the smart device (5). The scan wedge (21) is preferably provided with programming techniques such as reflection or introspection (not shown) in order to interrogate a running application on the smart device (5). Further, the scan wedge (21) is preferably provided with logic to recognize patterns in barcode scan data. Malicious code injection attacks (SQL injection) often have regular patterns which can be detected by logic.

Reflection is a programming technique known in the art which can be used for observing and/or modifying an application execution at runtime. A reflection-oriented application component can monitor the execution of an enclosure of code and can modify itself according to a desired goal related to that enclosure. This is typically accomplished by dynamically assigning program code at runtime.

Introspection is a programming technique known in the art, which is the ability of a program or an application to examine the type or properties of an object or application at runtime.

Figure 2:
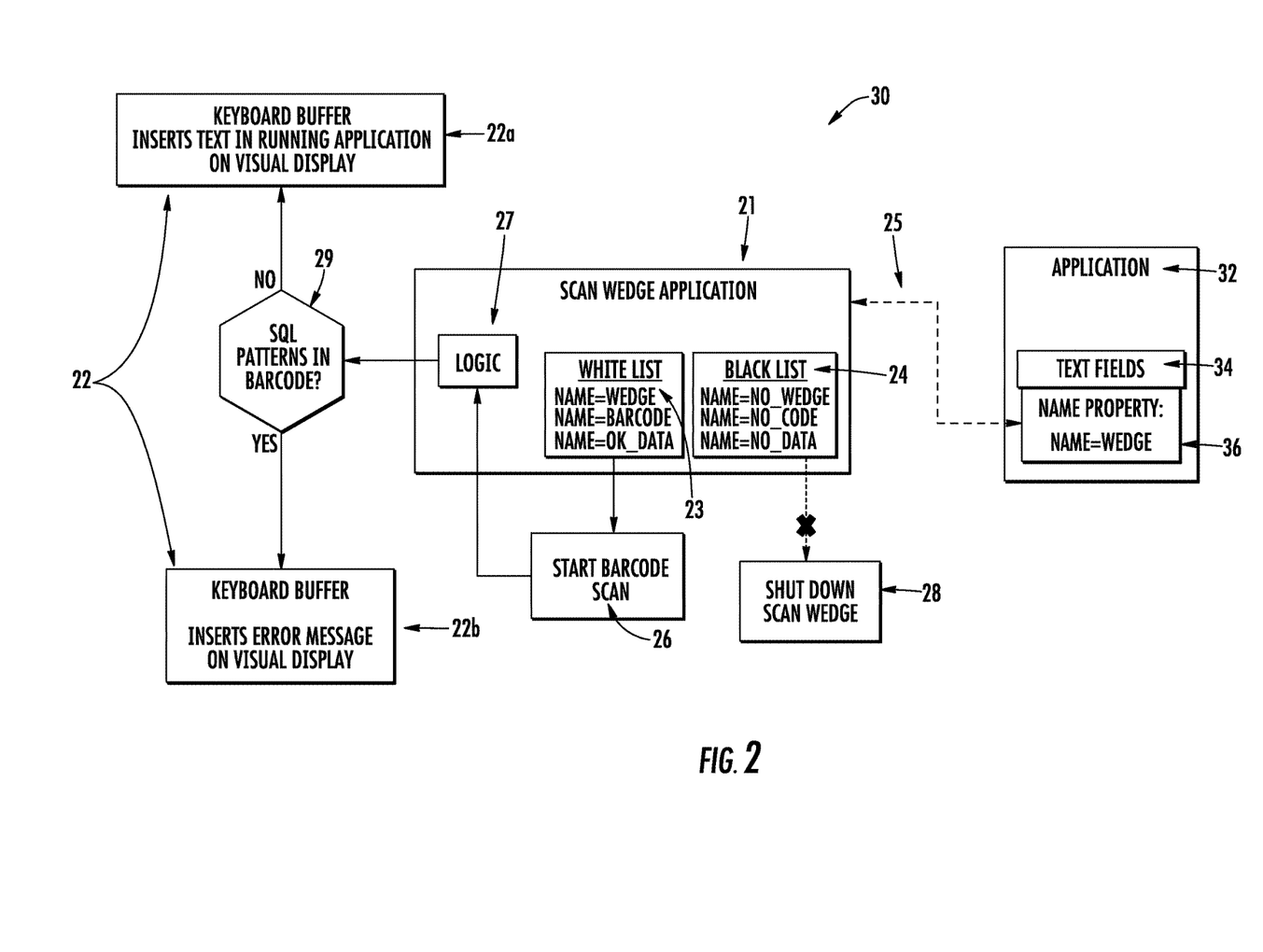
FIG. 2 schematically depicts one embodiment of the system wherein a barcode scan is permitted.

In one exemplary embodiment the invention, a system for regulating the injection of barcode scan data into an application running on a smart device is provided and schematically depicted in FIG. 2. Referring now to FIG. 2, in conjunction with the smartphone (5) depicted in FIG. 1, the system (30) comprises a running application (32) on the smart device (5). The application (32) may be resident on the smartphone (5), or may be an application viewed on a web browser on the smart device (5). The application has at least one text field (34). The text field (34) has text field properties (36). The text field properties (36) are designated to either accept access or restrict access to each of the text fields from barcode scan data. The system further comprises a keyboard buffer (22). The system further comprises a scan wedge (21) which has access to the keyboard buffer (22). The scan wedge (21) is provided with means to discriminate between access and restricted access designations in the text field properties (36). The means to discriminate are configured to interrogate (the interrogation shown as broken line 25) the text field properties (36) to determine if the text field (34) permits access to barcode scan data. The scan wedge (21) is configured to begin a barcode scan operation (26) if the text field (34) permits access to barcode scan data. The scan wedge (21) is further configured to load barcode scan data into the keyboard buffer (22); and the keyboard buffer (22*a*) is configured to display the barcode scan data as text in the text field (34) of the running application (32).

In another exemplary embodiment, before the scan wedge (21) loads barcode scan data into keyboard buffer (22), the scan wedge (21) is configured to use logic (27) to inspect the barcode scan data for regular patterns consistent with malicious attacks.

SQL injection attacks may exhibit regular patterns of code. For example, the malicious attack may try to pull records in an application. Next, the malicious attack uses code to set database properties or usernames as variables and block legitimate queries. With true statements in code, the attack co-opts the username (made variable before) for authentication. Finally, once in, the attacks instruct the application to dump its database to the malicious attacker. These steps have known patterns.

The logic (27) recognizes the presence or absence of these regular patterns. The logic (27) decision box (29) in the Figure shows the options if regular patterns consistent with malicious attacks are found or not found in the barcode data. If, "yes", there are regular patterns, then the scan wedge (21) is configured to instruct the keyboard buffer (22*b*) to insert an error message in the running application (32). For example, the error message may be: "Warning, the barcode data has been flagged as malicious, would you like to accept it anyway?", or something similar. If, "no", the regular patterns are not found, then the barcode scan data is loaded into the keyboard buffer (22*a*) for insertion in the text field (34) of the running application (32) as text.

In an exemplary embodiment illustrated in the FIG. 2, at least one text field property (36) is a readable property of the text field (34). The readable text field property (36) has associated values which describe attributes of the text field (34). These attributes designate whether access to the text field (34) is permitted or not permitted. The scan wedge (21) is provided with the value of the readable text field property (36). The text field property (36) and the associated value are a value pair. The scan wedge (21) is configured to look for the value pairs of the text field property (36). The scan wedge (21) is being further configured to begin or start the barcode scan operation (26) only if the value pair on the text property (36) corresponds to the value pair provided on the scan wedge 21).

The readable text field property (36) describes the text field (34) and is selected from an id, a name, a tag, and other descriptor properties. The means to discriminate is accomplished with programming techniques selected from reflection and introspection. Further, the means to discriminate comprises a white list (23) and a black list (24) provided on the scan wedge (21). The text field properties (36) are values either on the white list (23) or on the black list (24). Values on the white list (23) designate permitted access to the text field (34) by barcode scan data. Values on the black list (24) designate restricted access to the text field (34) by barcode scan data. The scan wedge (21) is configured to interrogate (25) the text field properties (36) and identify whether the text field property (36) values, in this case the Name Property, are on the white list (23) or on the black list (24). In the figure, the value pair for the Name text field Property is "Name=Wedge". This value pair is on the white list (23). Therefore the scan wedge (21) allows the barcode scan operation to begin.

Figure 3:
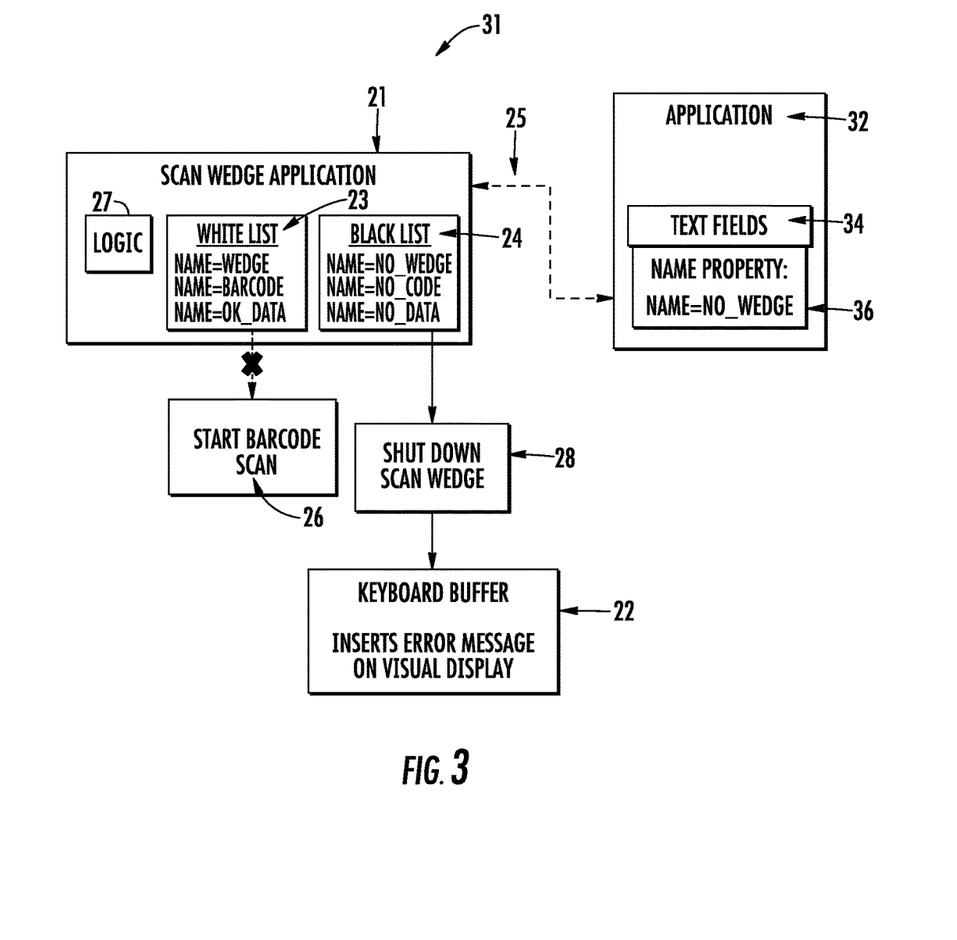
FIG. 3 schematically depicts one embodiment of the system wherein a barcode scan is not permitted.

Referring now to FIG. 3, the system (31) is depicted schematically in the case where once again the readable text field property (36) describes the text field (34) and is selected from an id, a name, a tag, and other descriptor properties. The means to discriminate is accomplished with programming techniques selected from reflection and introspection. Further, the means to discriminate comprises a white list (23) and a black list (24) provided on the scan wedge (21). The text field properties (36) are values either on the white list (23) or on the black list (24). Values on the white list (23) designate permitted access to the text field (34) by barcode scan data. Values on the black list (24) designate restricted access to the text field (34) by barcode scan data. The scan wedge (21) is configured to interrogate (25) the text field properties (36) and identify whether the text field property (36) values, in this case the Name Property, are on the white list (23) or on the black list (24). In the current figure, the Name property (36) has value pair of Name=No Wedge. This value pair is on the black list (24) of the scan wedge (21). Thus the text field (34) restricts access to bar code scan data. The scan wedge (21) is configured in this case to shut down and cause an error message to be loaded on the keyboard buffer (22). The keyboard buffer will insert the error message as text in the running application (32) on the visual display (not shown). The error message may be for example, "This field does not permit scan wedge data", or the like.

The present invention embraces a method for regulating the injection of barcode scan data into an application running on a smart device. The smart device may be a smart phone, tablet, or the like. Generally, a smart device proper to the present invention will have certain components as depicted schematically and described hereinbefore in conjunction with FIG. 1.

Figure 4:
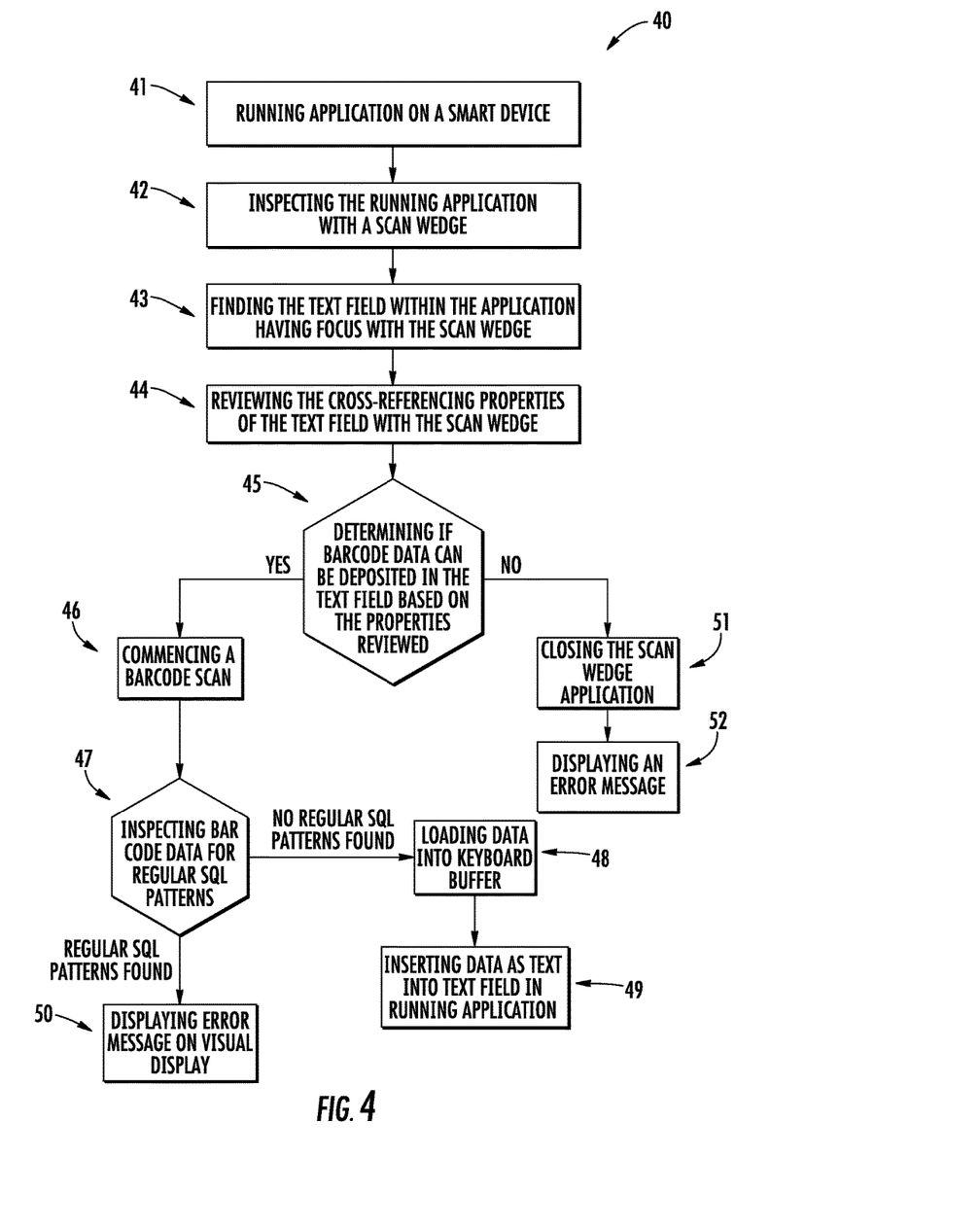
FIG. 4 schematically depicts a flowchart of the steps to carry out the method of regulating the injection of barcode scan data into a running application on a smart device in accordance with one embodiment of the present invention.

In an exemplary embodiment of the present invention, a method is schematically depicted as a flow chart in FIG. 4. Referring now to FIG. 4, the method (40) comprises the steps of: (41) running an application on a smart device, (42) inspecting the running application with a scan wedge, (43) finding a text field within the application having focus with the scan wedge, (44) reviewing and cross-referencing properties of the text field with the scan wedge, (45) determining if barcode data can be deposited in the text field based on the properties reviewed, (46) commencing a barcode scan if the determining step shows that barcode data is permitted, and closing the scan wedge application if the determining step shows that barcode data is not permitted. The method may further comprise the step of (51) displaying an error message in the text field of the running application if the determining step shows that barcode data is not permitted.

In a further exemplary embodiment of the method (40) shown in the present Figure, if the (46) commencing step is permitted, the method (40) further comprises the steps of: (47) inspecting barcode scan data for regular patterns of malicious attacks, (48) loading the barcode scan data into the keyboard buffer, and (49) inserting the barcode scan data as text in the text field of the running application if no regular patterns are found in the (47) inspecting barcode scan data step. If regular patterns are found in the (47) inspecting barcode scan data step, the method (40) further comprises the step of (50) displaying an error message on visual display as text.

In an exemplary embodiment of the invention, the scan wedge is provided with logic, and the (47) inspecting barcode scan data step is accomplished using the logic.

In yet another exemplary embodiment of the invention, the scan wedge is provided with programming capabilities selected from reflection and introspection, and (42) the inspecting step, the (43) finding step, and the (44) reviewing step are accomplished using the programming techniques.

In yet another exemplary embodiment of the invention, the scan wedge is provided with a white list and a black list. The text field properties are values either on the white list or on the black list. The values on the white list designate permitted access to the text field by barcode scan data. Values on the black list designate restricted access to the text field by barcode scan data. The (44) reviewing step is accomplished by cross-referencing the text field property values with the white list and black list on the scan wedge. Thus, barcode data can be inserted in a text field in the (49) inserting data step if the (45) determining step shows the text field property value is on the white list of the scan wedge. Contrarily, barcode data cannot be deposited in a text field if the (45) determining step shows the text field property value is on the black list of the scan wedge.

To supplement the present disclosure, this application incorporates entirely by reference the following commonly assigned patents, patent application publications, and patent applications:
U.S. Pat. No. 6,832,725; U.S. Pat. No. 7,128,266;
U.S. Pat. No. 7,159,783; U.S. Pat. No. 7,413,127;
U.S. Pat. No. 7,726,575; U.S. Pat. No. 8,294,969;
U.S. Pat. No. 8,317,105; U.S. Pat. No. 8,322,622;
U.S. Pat. No. 8,366,005; U.S. Pat. No. 8,371,507;
U.S. Pat. No. 8,376,233; U.S. Pat. No. 8,381,979;
U.S. Pat. No. 8,390,909; U.S. Pat. No. 8,408,464;
U.S. Pat. No. 8,408,468; U.S. Pat. No. 8,408,469;
U.S. Pat. No. 8,424,768; U.S. Pat. No. 8,448,863;
U.S. Pat. No. 8,457,013; U.S. Pat. No. 8,459,557;
U.S. Pat. No. 8,469,272; U.S. Pat. No. 8,474,712;
U.S. Pat. No. 8,479,992; U.S. Pat. No. 8,490,877;
U.S. Pat. No. 8,517,271; U.S. Pat. No. 8,523,076;
U.S. Pat. No. 8,528,818; U.S. Pat. No. 8,544,737;
U.S. Pat. No. 8,548,242; U.S. Pat. No. 8,548,420;
U.S. Pat. No. 8,550,335; U.S. Pat. No. 8,550,354;
U.S. Pat. No. 8,550,357; U.S. Pat. No. 8,556,174;
U.S. Pat. No. 8,556,176; U.S. Pat. No. 8,556,177;
U.S. Pat. No. 8,559,767; U.S. Pat. No. 8,599,957;
U.S. Pat. No. 8,561,895; U.S. Pat. No. 8,561,903;
U.S. Pat. No. 8,561,905; U.S. Pat. No. 8,565,107;
U.S. Pat. No. 8,571,307; U.S. Pat. No. 8,579,200;
U.S. Pat. No. 8,583,924; U.S. Pat. No. 8,584,945;
U.S. Pat. No. 8,587,595; U.S. Pat. No. 8,587,697;
U.S. Pat. No. 8,588,869; U.S. Pat. No. 8,590,789;
U.S. Pat. No. 8,596,539; U.S. Pat. No. 8,596,542;
U.S. Pat. No. 8,596,543; U.S. Pat. No. 8,599,271;
U.S. Pat. No. 8,599,957; U.S. Pat. No. 8,600,158;
U.S. Pat. No. 8,600,167; U.S. Pat. No. 8,602,309;
U.S. Pat. No. 8,608,053; U.S. Pat. No. 8,608,071;
U.S. Pat. No. 8,611,309; U.S. Pat. No. 8,615,487;
U.S. Pat. No. 8,616,454; U.S. Pat. No. 8,621,123;
U.S. Pat. No. 8,622,303; U.S. Pat. No. 8,628,013;
U.S. Pat. No. 8,628,015; U.S. Pat. No. 8,628,016;
U.S. Pat. No. 8,629,926; U.S. Pat. No. 8,630,491;
U.S. Pat. No. 8,635,309; U.S. Pat. No. 8,636,200;
U.S. Pat. No. 8,636,212; U.S. Pat. No. 8,636,215;
U.S. Pat. No. 8,636,224; U.S. Pat. No. 8,638,806;
U.S. Pat. No. 8,640,958; U.S. Pat. No. 8,640,960;
U.S. Pat. No. 8,643,717; U.S. Pat. No. 8,646,692;
U.S. Pat. No. 8,646,694; U.S. Pat. No. 8,657,200;
U.S. Pat. No. 8,659,397; U.S. Pat. No. 8,668,149;
U.S. Pat. No. 8,678,285; U.S. Pat. No. 8,678,286;
U.S. Pat. No. 8,682,077; U.S. Pat. No. 8,687,282;
U.S. Pat. No. 8,692,927; U.S. Pat. No. 8,695,880;
U.S. Pat. No. 8,698,949; U.S. Pat. No. 8,717,494;
U.S. Pat. No. 8,717,494; U.S. Pat. No. 8,720,783;
U.S. Pat. No. 8,723,804; U.S. Pat. No. 8,723,904;
U.S. Pat. No. 8,727,223; U.S. Pat. No. D702,237;
U.S. Pat. No. 8,740,082; U.S. Pat. No. 8,740,085;
U.S. Pat. No. 8,746,563; U.S. Pat. No. 8,750,445;
U.S. Pat. No. 8,752,766; U.S. Pat. No. 8,756,059;
U.S. Pat. No. 8,757,495; U.S. Pat. No. 8,760,563;
U.S. Pat. No. 8,763,909; U.S. Pat. No. 8,777,108;
U.S. Pat. No. 8,777,109; U.S. Pat. No. 8,779,898;
U.S. Pat. No. 8,781,520; U.S. Pat. No. 8,783,573;
U.S. Pat. No. 8,789,757; U.S. Pat. No. 8,789,758;
U.S. Pat. No. 8,789,759; U.S. Pat. No. 8,794,520;
U.S. Pat. No. 8,794,522; U.S. Pat. No. 8,794,526;
U.S. Pat. No. 8,798,367; U.S. Pat. No. 8,807,431;
U.S. Pat. No. 8,807,432; U.S. Pat. No. 8,820,630;

International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2011/0202554;
U.S. Patent Application Publication No. 2012/0111946;
U.S. Patent Application Publication No. 2012/0138685;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0056285;
U.S. Patent Application Publication No. 2013/0070322;
U.S. Patent Application Publication No. 2013/0075168;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0200158;
U.S. Patent Application Publication No. 2013/0256418;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0278425;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306730;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0341399;
U.S. Patent Application Publication No. 2013/0342717;
U.S. Patent Application Publication No. 2014/0001267;
U.S. Patent Application Publication No. 2014/0002828;
U.S. Patent Application Publication No. 2014/0008430;
U.S. Patent Application Publication No. 2014/0008439;
U.S. Patent Application Publication No. 2014/0025584;
U.S. Patent Application Publication No. 2014/0027518;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061305;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0075846;
U.S. Patent Application Publication No. 2014/0076974;
U.S. Patent Application Publication No. 2014/0078341;
U.S. Patent Application Publication No. 2014/0078342;
U.S. Patent Application Publication No. 2014/0078345;
U.S. Patent Application Publication No. 2014/0084068;
U.S. Patent Application Publication No. 2014/0097249;
U.S. Patent Application Publication No. 2014/0098792;
U.S. Patent Application Publication No. 2014/0100774;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0108682;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0160329;
U.S. Patent Application Publication No. 2014/0166755;
U.S. Patent Application Publication No. 2014/0166757;
U.S. Patent Application Publication No. 2014/0166759;
U.S. Patent Application Publication No. 2014/0166760;
U.S. Patent Application Publication No. 2014/0166761;
U.S. Patent Application Publication No. 2014/0168787;
U.S. Patent Application Publication No. 2014/0175165;
U.S. Patent Application Publication No. 2014/0175169;
U.S. Patent Application Publication No. 2014/0175172;
U.S. Patent Application Publication No. 2014/0175174;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0203087;
U.S. Patent Application Publication No. 2014/0204268;
U.S. Patent Application Publication No. 2014/0214631;
U.S. Patent Application Publication No. 2014/0217166;
U.S. Patent Application Publication No. 2014/0217180;
U.S. patent application Ser. No. 13/367,978 for a Laser Scanning Module Employing an Elastomeric U-Hinge Based Laser Scanning Assembly, filed Feb. 7, 2012 (Feng et al.);

U.S. patent application Ser. No. 29/436,337 for an Electronic Device, filed Nov. 5, 2012 (Fitch et al.);

U.S. patent application Ser. No. 13/771,508 for an Optical Redirection Adapter, filed Feb. 20, 2013 (Anderson);

U.S. patent application Ser. No. 13/852,097 for a System and Method for Capturing and Preserving Vehicle Event Data, filed Mar. 28, 2013 (Barker et al.);

U.S. patent application Ser. No. 13/902,110 for a System and Method for Display of Information Using a Vehicle-Mount Computer, filed May 24, 2013 (Hollifield);

U.S. patent application Ser. No. 13/902,144, for a System and Method for Display of Information Using a Vehicle-Mount Computer, filed May 24, 2013 (Chamberlin);

U.S. patent application Ser. No. 13/902,242 for a System For Providing A Continuous Communication Link With A Symbol Reading Device, filed May 24, 2013 (Smith et al.);

U.S. patent application Ser. No. 13/912,262 for a Method of Error Correction for 3D Imaging Device, filed Jun. 7, 2013 (Jovanovski et al.);

U.S. patent application Ser. No. 13/912,702 for a System and Method for Reading Code Symbols at Long Range Using Source Power Control, filed Jun. 7, 2013 (Xian et al.);

U.S. patent application Ser. No. 29/458,405 for an Electronic Device, filed Jun. 19, 2013 (Fitch et al.);

U.S. patent application Ser. No. 13/922,339 for a System and Method for Reading Code Symbols Using a Variable Field of View, filed Jun. 20, 2013 (Xian et al.);

U.S. patent application Ser. No. 13/927,398 for a Code Symbol Reading System Having Adaptive Autofocus, filed Jun. 26, 2013 (Todeschini);

U.S. patent application Ser. No. 13/930,913 for a Mobile Device Having an Improved User Interface for Reading Code Symbols, filed Jun. 28, 2013 (Gelay et al.);

U.S. patent application Ser. No. 29/459,620 for an Electronic Device Enclosure, filed Jul. 2, 2013 (London et al.);

U.S. patent application Ser. No. 29/459,681 for an Electronic Device Enclosure, filed Jul. 2, 2013 (Chaney et al.);

U.S. patent application Ser. No. 13/933,415 for an Electronic Device Case, filed Jul. 2, 2013 (London et al.);

U.S. patent application Ser. No. 29/459,785 for a Scanner and Charging Base, filed Jul. 3, 2013 (Fitch et al.);

U.S. patent application Ser. No. 29/459,823 for a Scanner, filed Jul. 3, 2013 (Zhou et al.);

U.S. patent application Ser. No. 13/947,296 for a System and Method for Selectively Reading Code Symbols, filed Jul. 22, 2013 (Rueblinger et al.);

U.S. patent application Ser. No. 13/950,544 for a Code Symbol Reading System Having Adjustable Object Detection, filed Jul. 25, 2013 (Jiang);

U.S. patent application Ser. No. 13/961,408 for a Method for Manufacturing Laser Scanners, filed Aug. 7, 2013 (Saber et al.);

U.S. patent application Ser. No. 14/018,729 for a Method for Operating a Laser Scanner, filed Sep. 5, 2013 (Feng et al.);

U.S. patent application Ser. No. 14/019,616 for a Device Having Light Source to Reduce Surface Pathogens, filed Sep. 6, 2013 (Todeschini);

U.S. patent application Ser. No. 14/023,762 for a Handheld Indicia Reader Having Locking Endcap, filed Sep. 11, 2013 (Gannon);

U.S. patent application Ser. No. 14/035,474 for Augmented-Reality Signature Capture, filed Sep. 24, 2013 (Todeschini);

U.S. patent application Ser. No. 29/468,118 for an Electronic Device Case, filed Sep. 26, 2013 (Oberpriller et al.);

U.S. patent application Ser. No. 14/055,234 for Dimensioning System, filed Oct. 16, 2013 (Fletcher);

U.S. patent application Ser. No. 14/053,314 for Indicia Reader, filed Oct. 14, 2013 (Huck);

U.S. patent application Ser. No. 14/065,768 for Hybrid System and Method for Reading Indicia, filed Oct. 29, 2013 (Meier et al.);

U.S. patent application Ser. No. 14/074,746 for Self-Checkout Shopping System, filed Nov. 8, 2013 (Hejl et al.);

U.S. patent application Ser. No. 14/074,787 for Method and System for Configuring Mobile Devices via NFC Technology, filed Nov. 8, 2013 (Smith et al.);

U.S. patent application Ser. No. 14/087,190 for Optimal Range Indicators for Bar Code Validation, filed Nov. 22, 2013 (Hejl);

U.S. patent application Ser. No. 14/094,087 for Method and System for Communicating Information in an Digital Signal, filed Dec. 2, 2013 (Peake et al.);

U.S. patent application Ser. No. 14/101,965 for High Dynamic-Range Indicia Reading System, filed Dec. 10, 2013 (Xian);

U.S. patent application Ser. No. 14/150,393 for Indicia-reader Having Unitary Construction Scanner, filed Jan. 8, 2014 (Colavito et al.);

U.S. patent application Ser. No. 14/154,207 for Laser Barcode Scanner, filed Jan. 14, 2014 (Hou et al.);

U.S. patent application Ser. No. 14/165,980 for System and Method for Measuring Irregular Objects with a Single Camera filed Jan. 28, 2014 (Li et al.);

U.S. patent application Ser. No. 14/166,103 for Indicia Reading Terminal Including Optical Filter filed Jan. 28, 2014 (Lu et al.);

U.S. patent application Ser. No. 14/200,405 for Indicia Reader for Size-Limited Applications filed Mar. 7, 2014 (Feng et al.);

U.S. patent application Ser. No. 14/231,898 for Hand-Mounted Indicia-Reading Device with Finger Motion Triggering filed Apr. 1, 2014 (Van Horn et al.);

U.S. patent application Ser. No. 14/250,923 for Reading Apparatus Having Partial Frame Operating Mode filed Apr. 11, 2014, (Deng et al.);

U.S. patent application Ser. No. 14/257,174 for Imaging Terminal Having Data Compression filed Apr. 21, 2014, (Barber et al.);

U.S. patent application Ser. No. 14/257,364 for Docking System and Method Using Near Field Communication filed Apr. 21, 2014 (Showering);

U.S. patent application Ser. No. 14/264,173 for Autofocus Lens System for Indicia Readers filed Apr. 29, 2014 (Ackley et al.);

U.S. patent application Ser. No. 14/274,858 for Mobile Printer with Optional Battery Accessory filed May 12, 2014 (Marty et al.);

U.S. patent application Ser. No. 14/277,337 for MULTI-PURPOSE OPTICAL READER, filed May 14, 2014 (Jovanovski et al.);

U.S. patent application Ser. No. 14/283,282 for TERMINAL HAVING ILLUMINATION AND FOCUS CONTROL filed May 21, 2014 (Liu et al.);

U.S. patent application Ser. No. 14/300,276 for METHOD AND SYSTEM FOR CONSIDERING INFORMATION ABOUT AN EXPECTED RESPONSE WHEN PERFORMING SPEECH RECOGNITION, filed Jun. 10, 2014 (Braho et al.);

U.S. patent application Ser. No. 14/305,153 for INDICIA READING SYSTEM EMPLOYING DIGITAL GAIN CONTROL filed Jun. 16, 2014 (Xian et al.);

U.S. patent application Ser. No. 14/310,226 for AUTOFOCUSING OPTICAL IMAGING DEVICE filed Jun. 20, 2014 (Koziol et al.);

U.S. patent application Ser. No. 14/327,722 for CUSTOMER FACING IMAGING SYSTEMS AND METHODS FOR OBTAINING IMAGES filed Jul. 10, 2014 (Oberpriller et al);

U.S. patent application Ser. No. 14/327,827 for a MOBILE-PHONE ADAPTER FOR ELECTRONIC TRANSACTIONS, filed Jul. 10, 2014 (Hejl);

U.S. patent application Ser. No. 14/329,303 for CELL PHONE READING MODE USING IMAGE TIMER filed Jul. 11, 2014 (Coyle);

U.S. patent application Ser. No. 14/333,588 for SYMBOL READING SYSTEM WITH INTEGRATED SCALE BASE filed Jul. 17, 2014 (Barten);

U.S. patent application Ser. No. 14/334,934 for a SYSTEM AND METHOD FOR INDICIA VERIFICATION, filed Jul. 18, 2014 (Hejl);

U.S. patent application Ser. No. 14/336,188 for METHOD OF AND SYSTEM FOR DETECTING OBJECT WEIGHING INTERFERENCES, Filed Jul. 21, 2014 (Amundsen et al.);

U.S. patent application Ser. No. 14/339,708 for LASER SCANNING CODE SYMBOL READING SYSTEM, filed Jul. 24, 2014 (Xian et al.);

U.S. patent application Ser. No. 14/340,627 for an AXIALLY REINFORCED FLEXIBLE SCAN ELEMENT, filed Jul. 25, 2014 (Rueblinger et al.);

U.S. patent application Ser. No. 14/340,716 for an OPTICAL IMAGER AND METHOD FOR CORRELATING A MEDICATION PACKAGE WITH A PATIENT, filed Jul. 25, 2014 (Ellis);

U.S. patent application Ser. No. 14/342,544 for Imaging Based Barcode Scanner Engine with Multiple Elements Supported on a Common Printed Circuit Board filed Mar. 4, 2014 (Liu et al.);

U.S. patent application Ser. No. 14/345,735 for Optical Indicia Reading Terminal with Combined Illumination filed Mar. 19, 2014 (Ouyang);

U.S. patent application Ser. No. 14/336,188 for METHOD OF AND SYSTEM FOR DETECTING OBJECT WEIGHING INTERFERENCES, Filed Jul. 21, 2014 (Amundsen et al.);

U.S. patent application Ser. No. 14/355,613 for Optical Indicia Reading Terminal with Color Image Sensor filed May 1, 2014 (Lu et al.);

U.S. patent application Ser. No. 14/370,237 for WEB-BASED SCAN-TASK ENABLED SYSTEM AND METHOD OF AND APPARATUS FOR DEVELOPING AND DEPLOYING THE SAME ON A CLIENT-SERVER NETWORK filed Jul. 2, 2014 (Chen et al.);

U.S. patent application Ser. No. 14/370,267 for INDUSTRIAL DESIGN FOR CONSUMER DEVICE BASED SCANNING AND MOBILITY, filed Jul. 2, 2014 (Ma et al.);

U.S. patent application Ser. No. 14/376,472, for an ENCODED INFORMATION READING TERMINAL INCLUDING HTTP SERVER, filed Aug. 4, 2014 (Lu);

U.S. patent application Ser. No. 14/379,057 for METHOD OF USING CAMERA SENSOR INTERFACE TO TRANSFER MULTIPLE CHANNELS OF SCAN DATA USING AN IMAGE FORMAT filed Aug. 15, 2014 (Wang et al.);

U.S. patent application Ser. No. 14/452,697 for INTERACTIVE INDICIA READER, filed Aug. 6, 2014 (Todeschini);

U.S. patent application Ser. No. 14/453,019 for DIMENSIONING SYSTEM WITH GUIDED ALIGNMENT, filed Aug. 6, 2014 (Li et al.);

U.S. patent application Ser. No. 14/460,387 for APPARATUS FOR DISPLAYING BAR CODES FROM LIGHT EMITTING DISPLAY SURFACES filed Aug. 15, 2014 (Van Horn et al.);

U.S. patent application Ser. No. 14/460,829 for ENCODED INFORMATION READING TERMINAL WITH WIRELESS PATH SELECTON CAPABILITY, filed Aug. 15, 2014 (Wang et al.);

U.S. patent application Ser. No. 14/462,801 for MOBILE COMPUTING DEVICE WITH DATA COGNITION SOFTWARE, filed on Aug. 19, 2014 (Todeschini et al.);

U.S. patent application Ser. No. 14/446,387 for INDICIA READING TERMINAL PROCESSING PLURALITY OF FRAMES OF IMAGE DATA RESPONSIVELY TO TRIGGER SIGNAL ACTIVATION filed Jul. 30, 2014 (Wang et al.);

U.S. patent application Ser. No. 14/446,391 for MULTIFUNCTION POINT OF SALE APPARATUS WITH OPTICAL SIGNATURE CAPTURE filed Jul. 30, 2014 (Good et al.);

U.S. patent application Ser. No. 29/486,759 for an Imaging Terminal, filed Apr. 2, 2014 (Oberpriller et al.);

U.S. patent application Ser. No. 29/492,903 for an INDICIA SCANNER, filed Jun. 4, 2014 (Zhou et al.); and U.S. patent application Ser. No. 29/494,725 for an IN-COUNTER BARCODE SCANNER, filed Jun. 24, 2014 (Oberpriller et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A system for regulating the injection of barcode scan data into an application running on a smart device, comprising:

a running application on a smart device, the application having text fields;

the text fields each having text field properties;

the text field properties being designated to either accept access or restrict access to each of the text fields from barcode scan data;

a keyboard buffer;

a scan wedge having access to the keyboard buffer, the scan wedge being provided with means to discriminate between access and restricted access designations in the text field properties;

the means to discriminate being configured to interrogate the text field properties to determine if one of the text fields permits access to barcode scan data;

the scan wedge being configured to begin a barcode scan operation if the one text field permits access to barcode scan data;

the scan wedge being configured to load barcode scan data into the keyboard buffer; and the keyboard buffer being configured to display the barcode scan data as text in the one text field of the application.

2. The system of claim 1, wherein the scan wedge is provided with logic to recognize patterns in barcode scan data, the scan wedge being further configured to inspect the barcode scan data for regular patterns consistent with malicious attacks, the scan wedge being configured to instruct the keyboard buffer to insert an error message in the running application if the regular patterns are found.

3. The system of claim 1, wherein at least one of the text field properties being a readable property of the text fields, the readable property having associated values which describe attributes of the text fields; the attributes designating whether access to the text fields are permitted or not permitted; the scan wedge being provided with the values of the readable property, the readable property and the associated values being a value pair; the scan wedge being configured to look for the value pair of the at least one text field properties; the scan wedge being further configured to begin the barcode scan operation only if the value pair of the at least one text field properties corresponds to the value pair provided on the scan wedge.

4. The system of claim 3, wherein the readable property describes the text fields and is selected from an id, a name, a tag, and other descriptor properties.

5. The system of claim 1, wherein the means to discriminate is accomplished with programming techniques selected from reflection and introspection.

6. The system of claim 1, wherein the scan wedge is configured to close if the one text field restricts access to barcode scan data.

7. The system of claim 6, wherein the scan wedge is configured to load an error message in the keyboard buffer if the one text field restricts access to barcode scan data; and the keyboard buffer is configured to display the error message in the one text field of the running application.

8. The system of claim 1, wherein the means to discriminate comprises a white list and a black list provided on the scan wedge; and wherein the text field properties being values either on the white list or on the black list, values on the white list designating permitted access to the text fields by barcode scan data, values on the black list designating restricted access to the text fields by barcode scan data; and wherein, the scan wedge is configured to interrogate the text field properties and identify whether the text field property values are on the white list or on the black list.

9. The system of claim 1, wherein the application is native on the smart device.

10. The system of claim 1, wherein the application is a web application running in a browser on the smart device.

11. A method of regulating the injection of barcode scan data into a running application on a smart device, comprising the steps of:
   i. running an application on a smart device, the application having at least one text field, the at least one text field having text field properties, the text field properties designating whether bar code scan data is permitted or not permitted in the at least one text field;
   ii. inspecting the running application with a scan wedge;
   iii. finding, with the scan wedge, a text field having focus within the application;
   iv. reviewing and cross-referencing, with the scan wedge, properties of the text field having focus;
   v. determining if barcode data can be deposited in the text field having focus based on the properties reviewed; and
   vi. commencing a barcode scan if the determining step shows that barcode data is permitted;
      wherein the inspecting step, the finding step, and the reviewing step are accomplished via programming capabilities of the scan wedge.

12. The method of claim 11, wherein if the barcode scan is commenced, further comprising the steps of: inspecting barcode scan data for regular patterns of malicious attacks; loading the barcode scan data into the keyboard buffer, and inserting the barcode scan data as text in the text field having focus if no regular patterns are found in the inspecting barcode scan data step; and displaying an error message if regular patterns are found in the inspecting barcode scan data step.

13. The method of claim 11, wherein the scan wedge comprises a scan wedge application, and further comprising: opening the scan wedge application prior to the inspecting step, and closing the scan wedge application if the determining step shows that barcode data is not permitted.

14. The method of claim 13, further comprising the step of: displaying an error message.

15. The method of claim 11, wherein the programming capabilities are provided using reflection or introspection programming techniques.

16. The method of claim 12, wherein the scan wedge is provided with logic, and the inspecting barcode scan data step is accomplished using the logic.

17. The method of claim 11, wherein the scan wedge is provided with a white list and a black list; and wherein the text field properties being values either on the white list or on the black list; values on the white list designating permitted access to the text field by barcode scan data, values on the black list designating restricted access to the text field by barcode scan data; and wherein, the reviewing step is accomplished by cross-referencing the text field property value of the text field having focus with the white list and black list on the scan wedge.

18. The method of claim 17, wherein barcode data can be deposited in the text field having focus if the determining step shows the text field property value is on the white list of the scan wedge.

19. The method of claim 17, wherein barcode data cannot be deposited in the text field having focus if the determining step shows the text field property value is on the black list of the scan wedge.

* * * * *